US008560141B2

(12) United States Patent
Shah et al.

(10) Patent No.: US 8,560,141 B2
(45) Date of Patent: Oct. 15, 2013

(54) MANAGEMENT OF A 3D PACKAGE AND COOLING SYSTEM

(75) Inventors: Amip Shah, Santa Clara, CA (US); Chandrakant Patel, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 349 days.

(21) Appl. No.: 12/936,000

(22) PCT Filed: Apr. 1, 2008

(86) PCT No.: PCT/US2008/059020
§ 371 (c)(1),
(2), (4) Date: Oct. 1, 2010

(87) PCT Pub. No.: WO2009/123622
PCT Pub. Date: Oct. 8, 2009

(65) Prior Publication Data
US 2011/0029154 A1     Feb. 3, 2011

(51) Int. Cl.
*G06F 19/00* (2011.01)
(52) U.S. Cl.
USPC .......................................... 700/300; 700/299
(58) Field of Classification Search
USPC ................................................ 700/299, 300
See application file for complete search history.

(56) References Cited

U.S. PATENT DOCUMENTS

| | | | |
|---|---|---|---|
| 5,777,897 A * | 7/1998 | Giorgio | 700/299 |
| 6,023,402 A | 2/2000 | Kaminski | |
| 6,172,611 B1 | 1/2001 | Hussain et al. | |
| 6,451,626 B1 * | 9/2002 | Lin | 438/108 |
| 6,836,849 B2 | 12/2004 | Brock et al. | |
| 7,123,996 B2 * | 10/2006 | Fukushima et al. | 700/299 |
| 7,644,148 B2 * | 1/2010 | Ranganathan et al. | 709/223 |
| 2004/0228091 A1 * | 11/2004 | Miyairi | 361/695 |
| 2005/0055590 A1 | 3/2005 | Farkas | |
| 2006/0259621 A1 * | 11/2006 | Ranganathan et al. | 709/226 |
| 2008/0294296 A1 * | 11/2008 | Liu et al. | 700/300 |
| 2008/0306634 A1 * | 12/2008 | Rozzi et al. | 700/300 |
| 2009/0259347 A1 * | 10/2009 | Gross et al. | 700/299 |

FOREIGN PATENT DOCUMENTS

| | | |
|---|---|---|
| CN | 2750086 | 1/2006 |
| CN | 1003400050 C | 11/2007 |

* cited by examiner

*Primary Examiner* — Michael D Masinick

(57) ABSTRACT

In a method for managing at least one three-dimensional package and a cooling system having at least one active cooling mechanism configured to cool the at least one three-dimensional package, at least one of workload on and an environmental condition on or around the at least one three-dimensional package is identified. In addition, at least one of an active cooling mechanism and a three-dimensional package is controlled based upon at least one of the identified workload and environmental condition.

17 Claims, 11 Drawing Sheets

MANAGEMENT OF A 3D PACKAGE AND COOLING SYSTEM

CROSS-REFERENCE TO RELATED APPLICATION

The present application is related to U.S. patent application Ser. No. 12/935,985, entitled "Cooling Provisioning Management in a Three Dimensional Package", filed on even date herewith, the disclosure of which is hereby incorporated by reference in its entirety.

BACKGROUND

Recent trends in semiconductor technology have been focused towards miniaturization of integrated circuit chip systems. This has resulted in the development of high density electronic package modules, such as, three-dimensional (3D) multi-die structures, which are composed of a plurality of die that are arranged in a stack to substantially reduce the amount of floorspace that the die occupy in a system. As with conventional die, part of the electrical energy for driving the stacked die is converted into thermal energy and dissipated as heat. The temperatures of the die greatly affect their performance. As such, effective heat removal is typically an important consideration in designing and operating the 3D multi-die electronic package modules.

Heat is typically removed from the die through use of passive cooling provisioning, such as, thermally conductive material positioned to convey heat from one die to another die or to a heat sink. Techniques for actively cooling the die have also been proposed through use of thermoelectric coolers having a P-type material plate and an N-type material plate mounted between various die. However, as the electronic package modules continue to become more dense with die having ever-increasing operational speeds, conventional techniques for dissipating the heat generated by the die in 3D multi-die electronic package modules may be unable to adequately cool the die, which may lead to reduced performance and early failure. Additional challenges in controlling the removal of heat arise when multiple 3D multi-die electronic package modules are arranged together.

It should therefore be appreciated that improvements in removing the heat dissipated from the die in 3D multi-die electronic package modules would be beneficial.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are a method for managing at least one three-dimensional (3D) package and a cooling system having at least one active cooling mechanism configured to cool the at least one 3D package. Also disclosed herein is an electronic structure containing the at least one 3D package and the cooling system.

Through implementation of the method and electronic structure disclosed herein, one or both of a 3D package and a cooling system may be controlled to substantially minimize energy consumption while providing adequate cooling to the 3D package.

Figure 1:
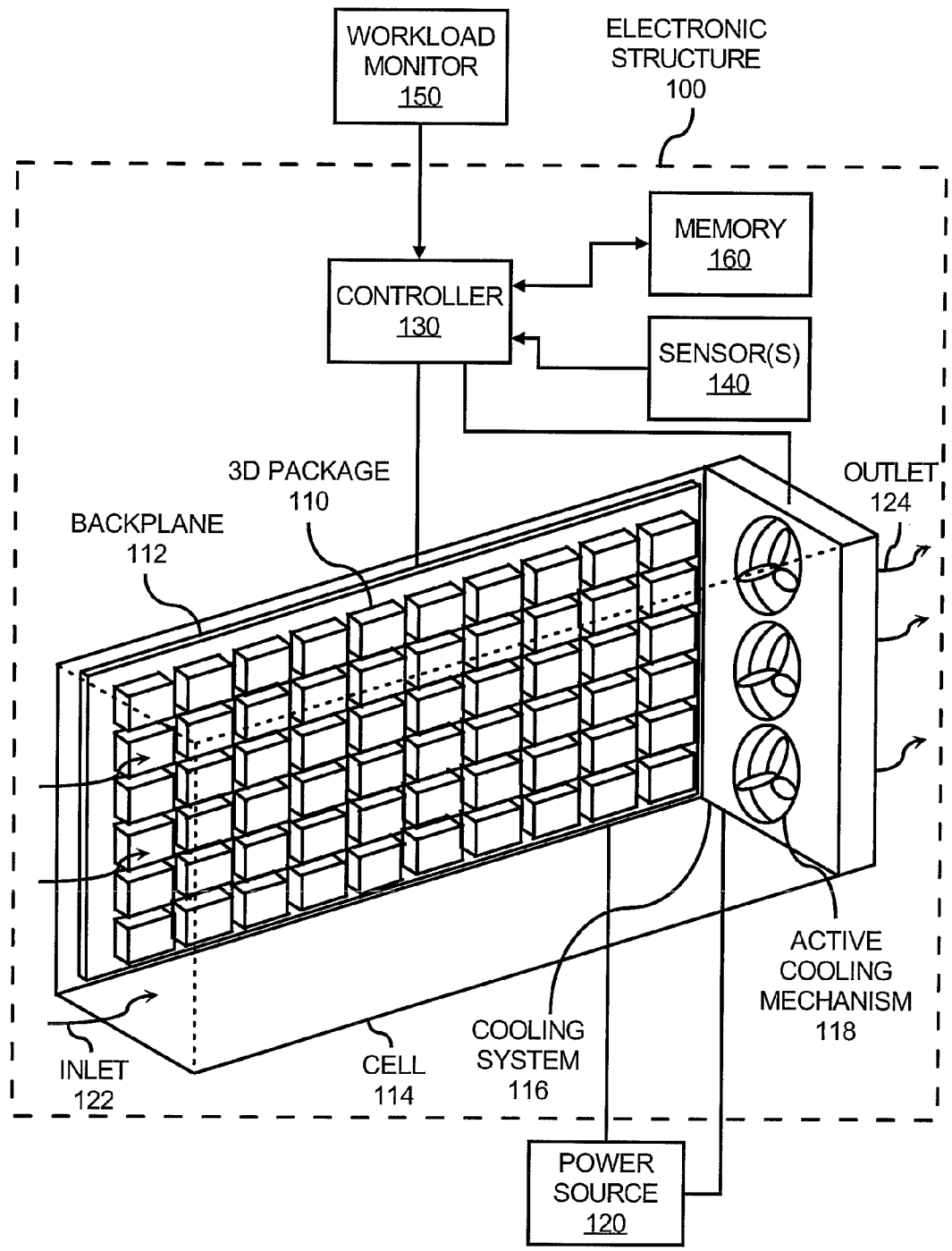
FIG. 1 shows a diagram of an electronic structure, according to an embodiment of the invention.

With reference first to FIG. 1, there is shown a diagram of an electronic structure 100, according to an example. It should be understood that the electronic structure 100 may include additional components and that one or more of the components described herein may be removed and/or modified without departing from a scope of the electronic structure 100.

Generally speaking, the electronic structure 100 comprises a plurality of three-dimensional (3D) packages 110 arranged on a backplane 112. The 3D packages 110 are formed of a plurality of stacked die, which are generally configured to perform one or more operations, such as, processing, data storage, etc. The 3D packages 110 are described in greater detail herein below.

The 3D packages 110 may be connected to the backplane 112 through any reasonably suitable means. In one example, the backplane 112 may comprise a printed circuit board substrate having electrical connections to which the 3D packages 110 are connected. In addition, the 3D packages 110 may receive electrical energy from a power source 120, such as, an AC or DC power supply, through the connections made with the backplane 112. In this regard, the backplane 112 may provide both structural support and connectivity to the 3D packages 110.

The 3D packages 110 and the backplane 112 are depicted as being housed in a cell 114. The cell 114 generally comprises an enclosure configured to, for instance, protect the 3D packages 110 from external conditions. The cell 114 also enables variously configured 3D packages 110 and backplanes to be substantially separated from each other and may thus provide clear delineations between various 3D packages 110. Alternatively, however, the 3D packages 110 and the backplane 112 may be supported separately from the cell 114. As a further alternative, the cell 114 may house a plurality of backplanes 112 and additional 3D packages 110 on the additional one or more backplanes 112.

The cell 114 may represent a relatively small structure or a relatively large structure. For instance, the cell 114 may have a size similar to a conventional cellular telephone, a size similar to a conventional server, a size similar to a conventional blade server, a size similar to a conventional shipping container, a size similar to either a small or large data center, etc. As such, it should be understood that the various examples discussed herein are applicable to electronic structures 100 having a multitude of different sizes.

The cell 114 is also depicted as including a cooling system 116 having system level active cooling mechanism 118. In the example depicted in FIG. 1, the system level active cooling mechanism 118 comprises fans. It should, however, be understood that the system level active cooling mechanism 118 may comprise other types of cooling mechanisms without departing from a scope of the electronic structure 100 disclosed herein. Examples of other suitable system level active cooling mechanisms 118 are described in greater detail herein below. As also discussed in greater detail herein below, the cooling system 116 may comprise passive cooling mechanisms, such as, heat sinks, heat pipes, etc., as well as package-level cooling mechanisms.

The electronic structure 100 is depicted as including a controller 130 that is connected to the 3D packages 110 through the backplane 112. As discussed above, the backplane 112 may include a plurality of electrical connections, similar to a printed circuit board, through which the controller 120 may interact with the 3D packages 110. The controller 130 is generally configured to perform various operations in the electronic structure 100. In one example, the controller 130 comprises one or more of the 3D packages 110 or one or more of the die in one or more of the 3D packages 110. In another example, the controller 130 comprises a computing device or processor remotely located from the 3D packages 110. In a further example, the controller 130 comprises software stored on a computer readable storage medium, that when implemented, is configured to perform various operations in the electronic structure 100.

As also shown in FIG. 1, the controller 130 is configured to receive input from one or more sensors 140 and a workload monitor 150. Although the controller 130 is depicted as receiving input from both the sensor(s) 140 and the workload monitor 150, it should be understood that the controller 130 may receive input from either or both of the sensor(s) 140 and the workload monitor 150 without departing from a scope of the electronic structure 100. In any regard, the controller 130 is configured to control one or both of the system level active cooling mechanism 118 and at least one of the 3D packages 110 based upon the input received from either or both of the sensor(s) 140 and the workload monitor 150.

According to an example, the controller 130 may control the system level active cooling mechanism 118 by substantially varying its operational level. For instance, the controller 130 may deactivate the system level active cooling mechanism 118 when an environmental condition, such as, temperature, detected within the cell 114 is below a predetermined level, such as, a safe operating temperature level. In addition, or alternatively, the controller 130 may control the one or more 3D packages 110 by varying the allocation of workload among the 3D packages 110. In certain instances, the controller 130 may allocate a workload to a 3D package 110 located in a different cell 114.

In any regard, the controller 130 may store the received input in a memory 160, which may also comprise one or more of the 3D packages 110 or one or more of the die in one or more of the 3D packages 110. In one example, the controller 130 may access programs or algorithms stored in the memory 160 in determining how the system level active cooling mechanism 118 is to be manipulated based upon the data contained in the input. In another example, the controller 130 may access programs or algorithms stored in the memory 160 in determining how workloads should be placed on the respective 3D packages 110 based upon the data contained in the input. Various programs or algorithms stored in the memory 160 are described below with respect to the flow diagrams.

The sensor(s) 140 may be configured and positioned to detect one or more environmental conditions, such as, temperature, vibration, airflow, optical conditions, etc., on or around one or more of the 3D packages 110. In one example, the sensor(s) 140 may be positioned to detect temperatures at one or more of the 3D packages 110. This example may include the detection of temperatures within one or more of the 3D packages 110, such as, in particular locations on the die of the one or more 3D packages, such as, known hot spots of the die, or other locations outside of the 3D packages 110. In addition or alternatively, the sensor(s) 140 may be positioned at one or more other locations within the cell 112, for instance, at a location to detect the temperature of air flowing through the cell 112 at locations away from the 3D packages 110. Furthermore, the sensor(s) 140 may be positioned at either or both of an inlet 122 and an outlet 124 of the cell 112. In addition, or alternatively, the sensor(s) 140 may monitor a condition that may be calculated to determine a correlated condition. For instance, the sensor(s) 140 may monitor electrical resistance and may calculate temperature from the monitored electrical resistance.

In addition, or alternatively, the controller 130 may determine the workload in each of the 3D packages 110 based upon information received from the workload monitor 150. The workload monitor 150 may comprise, for instance, hardware and/or software configured to at least one of predict and track workloads and to determine which of the 3D packages 110 is capable of performing the requested workloads. The workload monitor 150 may therefore communicate the workload requests to the controller 130 and the controller 130 may determine on which of the 3D packages 110 the workload is to be placed based upon one or more considerations as discussed below.

Prior to discussing the various manners in which the controller 130 operates, a discussion of the 3D packages 110 will now be presented.

Figure 2A:
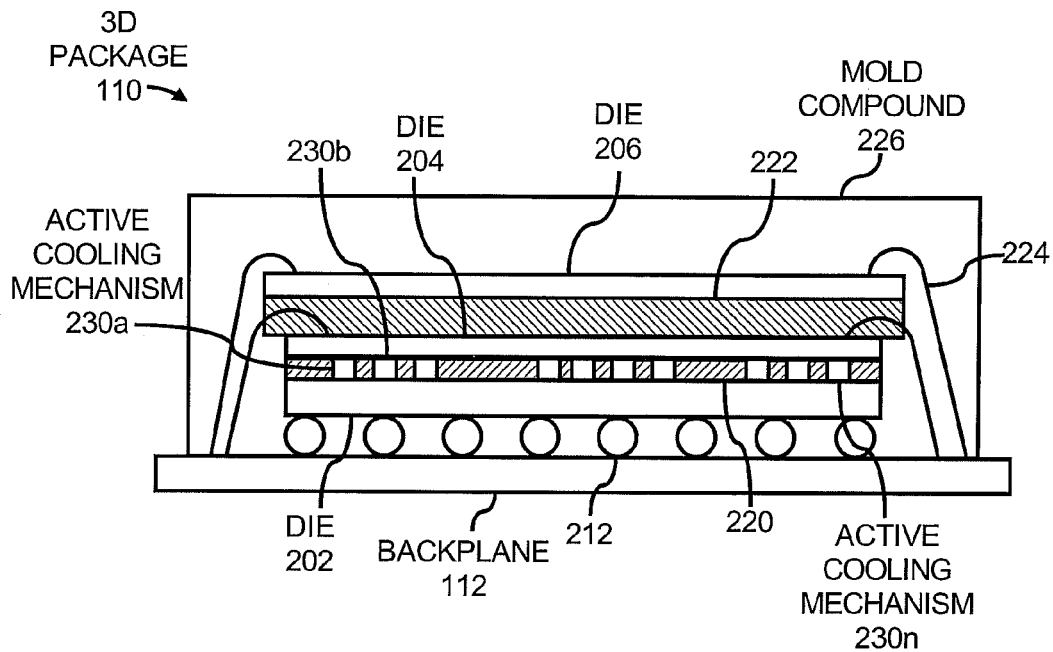
FIG. 2A depicts a simplified schematic diagram of a three-dimensional package containing a plurality of stacked die and a cooling system having a plurality of active cooling mechanisms, according to an embodiment of the invention.

Turning first to FIG. 2A, there is shown a simplified schematic diagram of a 3D package 110 containing a plurality of stacked die 202-206 and a package level cooling system having a plurality of package level active cooling mechanisms 230a-230n, according to an example. It should be understood that the 3D package 110 may include additional components and that some of the components described herein may be removed and/or modified without departing from a scope of the 3D package 110 described herein.

As shown in FIG. 2A, a three-dimensional package 110 includes a plurality of die 202-206. The die 202-206 may comprise integrated circuit chips configured to perform any reasonably suitable function. By way of example, a first die 202 may comprise a processor die and a second and third die 204 and 206 may comprise flash memory die. In another example, the three-dimensional package 110 may comprise a solid-state memory package, in which the die 202-206 may each comprise flash memories.

The first die 202 is depicted as being mounted on the backplane 112 through a plurality of solder joints 212. Alternatively, however, the first die 202 may be mounted onto a different substrate, which may then be mounted onto the backplane 112. The second die 204 is depicted as being attached to the first die 202 through an adhesive material 220, which may comprise a thermally conductive material. In addition, the third die 206 is depicted as being attached to the second die 204 through another adhesive material 222, which may also comprise a thermally conductive material. The second die 204 and the third die 206 are also depicted as being connected to the backplane 112 through various interconnects 224, which may comprise wirebonds, flip-chip interconnects, photonic interconnects, etc., configured to enable at least one of power and electronic signals to be communicated between the die 204 and 206 and the backplane 112. In addition, or alternatively, the third die 206 may be connected to the second die 204, which is connected to the backplane 112. The die 202-206 are further depicted as being supported within a mold compound 226, which operates to protect the die 202-206 and through which some of the heat generated in the die 202-206 may be dissipated.

In one example, all of the heat generated by the 3D packages 110 may be dissipated through operation of the system level active cooling mechanism 118 and may thus not be equipped with active cooling mechanisms. In another example, one or more of the 3D packages 110 may have one or more package level active cooling mechanisms 230a-230n, where "n" is an integer equal to or greater than zero, positioned in the adhesive material 220. Although not shown in FIG. 2A, some or all of the active cooling mechanisms 230a-230n may be integrated into one or more of the die 202-206 without departing from a scope of the three-dimensional package 110 discussed herein. The one or more package level active cooling mechanisms 230a-230n may provide additional cooling to 3D packages 110 having relatively greater densities, which may therefore require additional cooling.

The package level active cooling mechanisms 230a-230n may generally be defined as cooling mechanisms that consume electrical energy during their operation and are generally more effective at removing heat as compared with passive cooling mechanisms. The package level active cooling mechanisms 230a-230n may therefore be controlled by variations in the electrical energy supplied to the package level active cooling mechanisms 230a-230n. According to an example, the package level active cooling mechanisms 230a-230n comprise thermoelectric coolers, which include a P-type material plate and an N-type material plate. The P-type material plate and the N-type material plate may operate by the Peltier effect to draw heat from the first die 202 and deliver the heat to the second die 204, which may act to spread the heat. In this example, the package level active cooling mechanisms 230a-230n may be electrically connected to the backplane 112 to receive direct current (DC) power.

According to another example, the package level active cooling mechanisms 230a-230n comprise one or more other types of cooling mechanisms, such as, cold plates through which a cooling fluid is pumped. In this example, an electronically controllable pump (not shown) may be operated to vary the cooling fluid flow through the cold plates and thereby vary the amount of heat removed from the die 202-206. In addition, or alternatively, the cold plates may include insulating material that may be pumped therethrough to vary the amount of heat transferred between the die 202-206, for instance.

In any regard, the package level active cooling mechanisms 230a-230n may strategically be placed at various locations with respect to the die 202-206. The various locations may include those locations known to dissipate the greatest amount of heat, such as, local hot spots on one or more of the die 202-206. In this regard, heat removal from the die 202-206 may be targeted, thereby substantially optimizing energy efficiency in operating the package level active cooling mechanisms 230a-230n.

Although the package level active cooling mechanisms 230a-230n have been depicted as being positioned between the first die 202 and the second die 204, package level active cooling mechanisms 230a-230n may also be positioned between the second die 204 and the third die 206, between the first die 102 and the third die 106, across multiple die 102-106, etc. In addition, the 3D package 110 may include any reasonably suitable number of die and package level active cooling mechanisms 230a-230n without departing from a scope of the 3D package 110 disclosed herein.

Figure 2B:
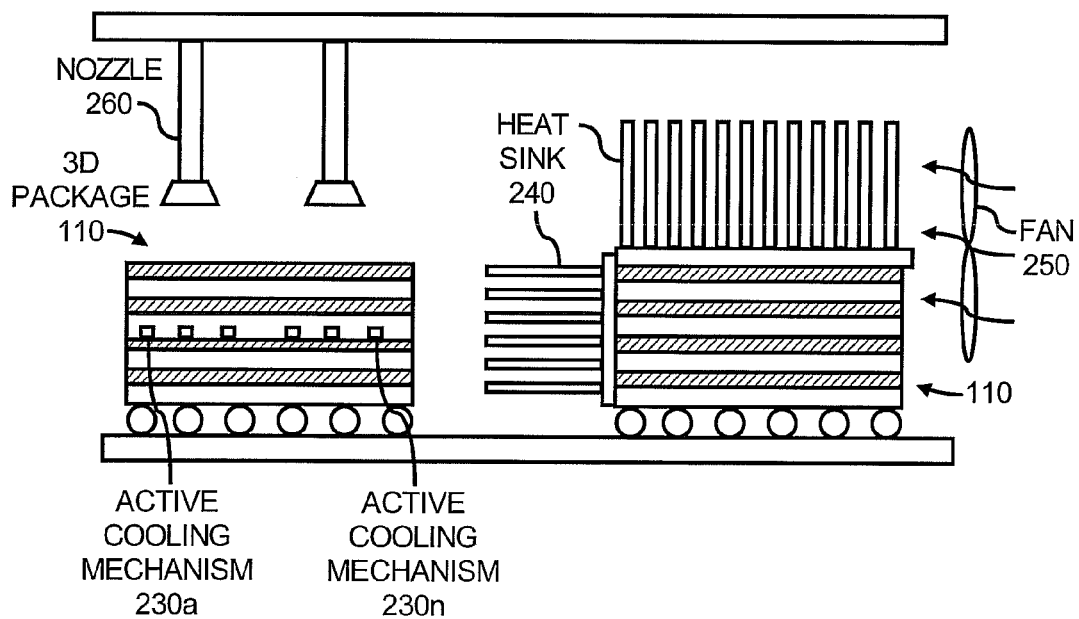
FIG. 2B depicts a simplified schematic diagram of a three-dimensional package containing a plurality of stacked die and a cooling system having a plurality of active cooling mechanisms, according to another embodiment of the invention.

The 3D package 110 may also be equipped with other types of cooling mechanisms, both active and passive. Passive cooling mechanisms may generally be defined as mechanisms that are configured to dissipate heat generated by one or more of the die 202-206 or the 3D package 110 itself, without requiring electrical energy. Some of these active and passive cooling mechanisms are depicted in FIG. 2B. As shown therein, passive cooling mechanisms, such as heat sinks 240 may be positioned along various axes of a 3D package 110. Although not shown, other types of passive cooling mechanisms, such as, heat pipes, loop thermosiphons, etc., may also be positioned between two or more of the die 202-206 and may be thermally connected to one or more heat sinks 240 to convey heat from the die 202-206 to the one or more heat sinks 240.

As also shown in FIG. 2B, some or all of the package level active cooling mechanisms 230a-230n may be integrally formed with at least one of the die 202-206. The package level active cooling mechanisms 230a-230n are further depicted as including an electronically controllable fan 250 configured to provide airflow to one or more of the 3D packages 110. The fan 250 may comprise an active cooling mechanism in addition to the system level active cooling mechanism 118 depicted in FIG. 1.

The package level active cooling mechanisms 230a-230n may also include one or more nozzles 260 for supplying cooling fluid, either liquid or air, to one or more of the 3D packages 110. In one example, the nozzles 260 may be configured and operated to provide substantially precise delivery of the cooling fluid to desired locations on the 3D packages 110. In another example, the nozzles 260 may be controlled to deliver the cooling fluid according to the amount of heat generated in the 3D packages 110.

It should be understood that the various 3D package 110 and cooling provisioning configurations shown in FIG. 2B may be modified without departing from a scope of the 3D package 110 and cooling system discussed herein.

Figure 3A:
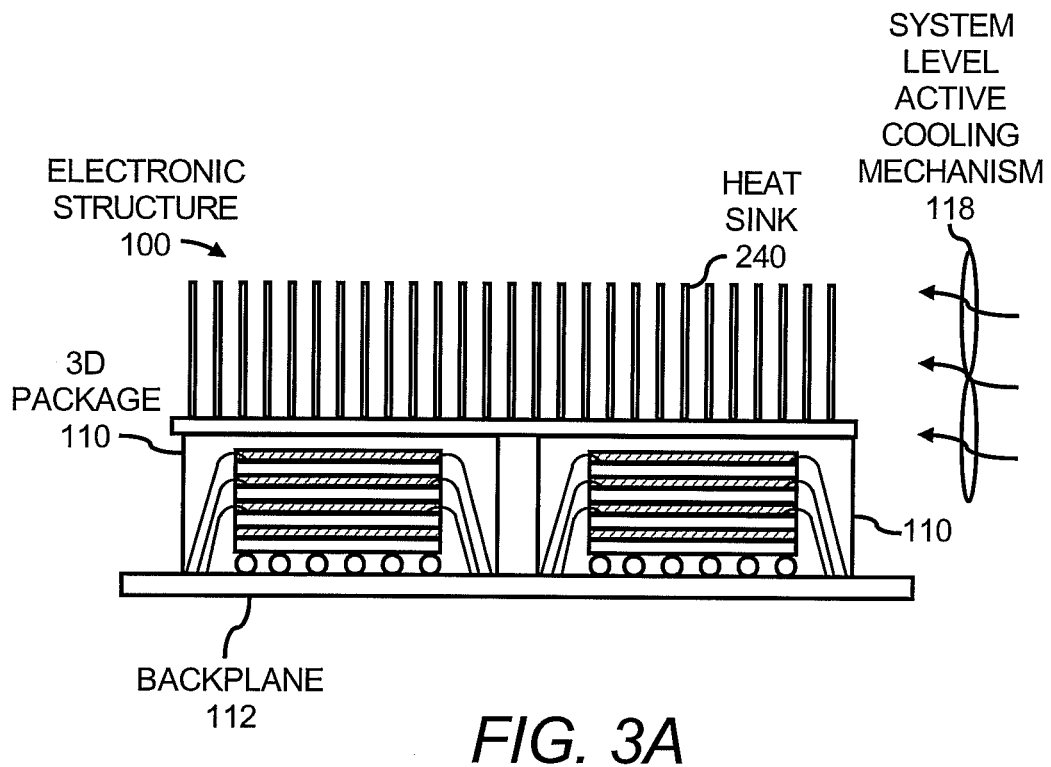
FIGS. 3A-3C, respectively, show simplified schematic diagrams of part of the electronic structure depicted in FIG. 1, according to embodiments of the invention.
Figure 3B:
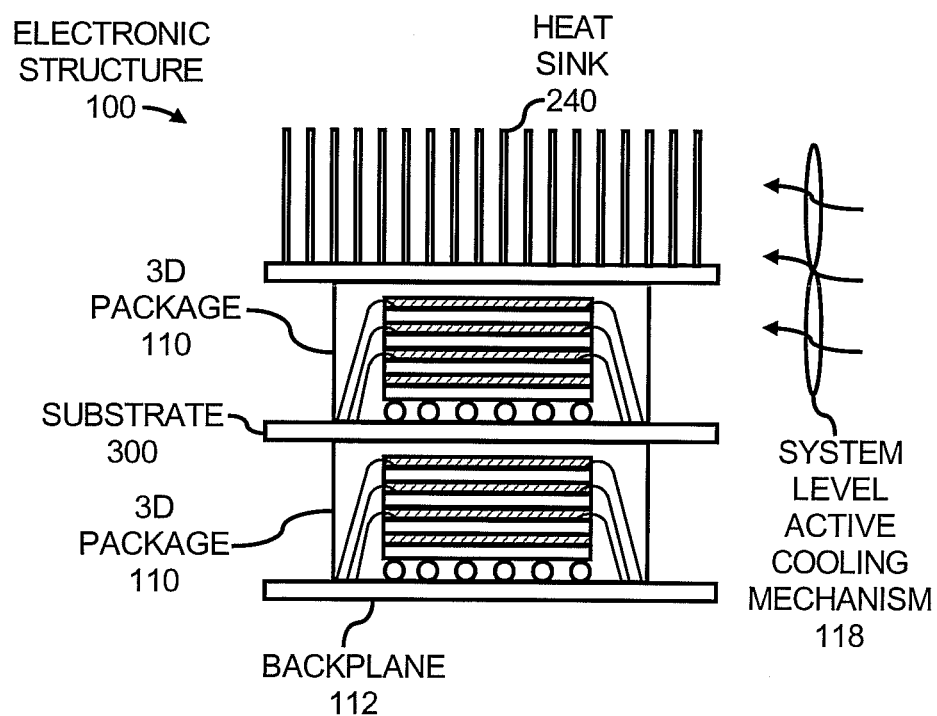
Figure 3C:
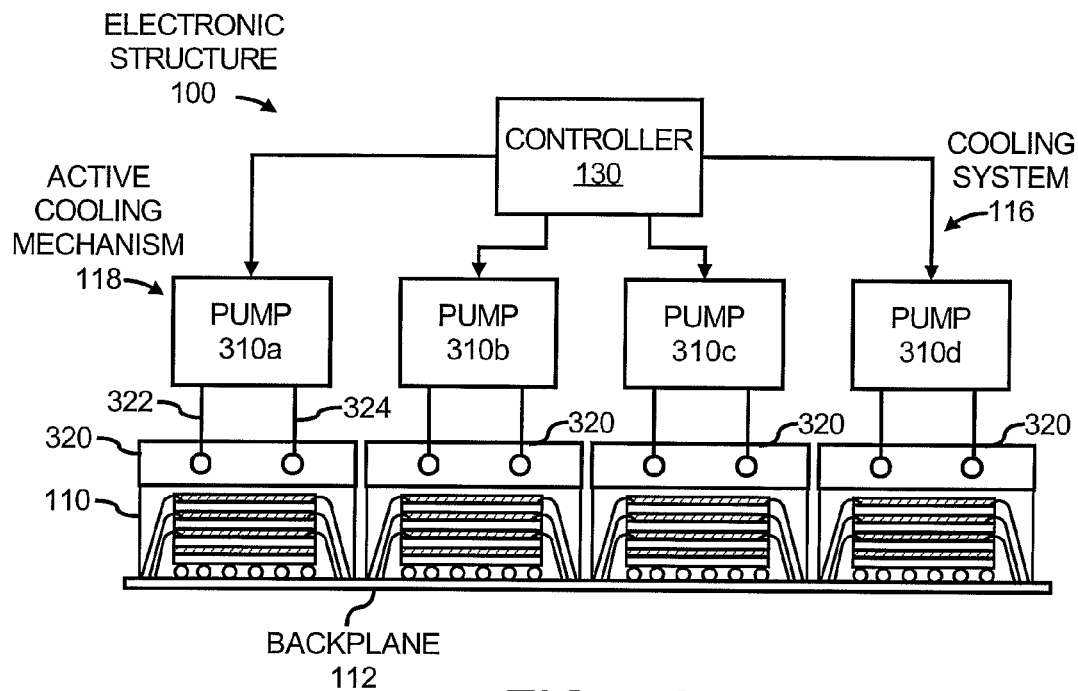

Turning now to FIGS. 3A-3C, there are shown simplified schematic diagrams of part of the electronic structure 100, according to three examples. It should be understood that the electronic structure 100 may include additional components and that some of the components described herein may be removed and/or modified without departing from a scope of the electronic structure 100 described herein. For instance, the electronic structures 100 depicted in FIGS. 3A-3C may include any reasonably suitable number of 3D packages 110 arranged in any reasonably suitable configuration.

With reference first to FIG. 3A, the electronic structure 100 is depicted as including a plurality of 3D packages 110 arranged across the backplane 112. Also shown in FIG. 3A is a heat sink 240 that spans across multiple ones of the 3D packages 110. In this configuration, for instance, the heat generated by the 3D packages 110 may be dissipated through airflow flowing through the heat sink 240 caused by the active cooling mechanism 118.

With reference now to FIG. 3B, the electronic structure 100 is depicted as including a 3D package 110 that is stacked on top of another 3D package 110. A substrate 300 is also depicted as being positioned between the 3D packages 110. The substrate 300 may be electrically connected to the backplane 112 to enable control signals and power to be delivered to the upper 3D package 110. In addition, the upper 3D package 110 is depicted as including a heat sink 240 for dissipating heat generated by both of the 3D packages 110. In this example, heat generated by the lower 3D package 110 may be conveyed through the upper 3D package 110 and into the heat sink 240 where it is dissipated. Alternatively, however, heat pipes (not shown) may be positioned to convey the heat directly from the lower 3D package 110 to the heat sink 240.

According to an example, in either or both of the electronic structures 100 depicted in FIGS. 3A and 3B, some or all of the 3D packages 110 may comprise relatively less dense structures and may thus require relatively less heat removal as compared with relatively more dense 3D packages 110. Those relatively less dense 3D packages 110 may be positioned in areas of the electronic structures 100 that receive relatively lower levels of cooling. For instance, with respect to FIG. 3A, the relatively less dense 3D packages 110 may be positioned downstream of the relatively more dense 3D packages 110. As another example, with respect to FIG. 3B, the relatively less dense 3D packages 110 may be positioned in the lower positions of the stacked packages 110.

In addition, or alternatively, one or more package level active cooling mechanisms 230a-230n may be provided for those 3D packages 110 having relatively more dense structures and/or in those 3D packages 110 that are positioned in areas that receive less cooling provisioning.

Turning now to FIG. 3C, the electronic structure 100 is depicted as including a plurality of 3D packages 110 arranged along the backplane 112. In addition, the active cooling mechanism 118 of the cooling system 116 is depicted as having a plurality of pumps 310a-310d and a plurality of cold plates 320. The active cooling mechanism 118 also includes an inlet line 322 and an outlet line 324 that the pumps 310a-310d may use to deliver and remove cooling fluid, such as, water, a refrigerant, etc., into and out of the cold plates 320. In this regard, the cold plates 320 are configured with channels (not shown) through which the cooling fluid flows to remove heat dissipated by the 3D packages 110.

The pumps 310a-310d are also depicted as being controlled by the controller 130. The controller 130 may thus control the pumps 310a-310d in a substantially individual basis to ensure that each of the 3D packages 110 receive adequate amounts of cooling.

Some or all of the embodiments depicted in FIGS. 3A-3C may be used together in the same cell 114. In this regard, the cell 114 may include various regions of 3D packages 110 that require different levels of cooling. For instance, a first region of the cell 114 may include 3D packages 110 configured to generate relatively lower amounts of heat and a second region of the cell 114 may include 3D packages 110 configured to generate relatively higher amounts of heat. In this example, the 3D packages 110 located in the first region may be equipped with heat sinks 240, as depicted in FIGS. 3A and 3B and the 3D packages 110 located in the second region may be equipped with the active cooling mechanisms 118 depicted in FIG. 3C.

Figure 4:
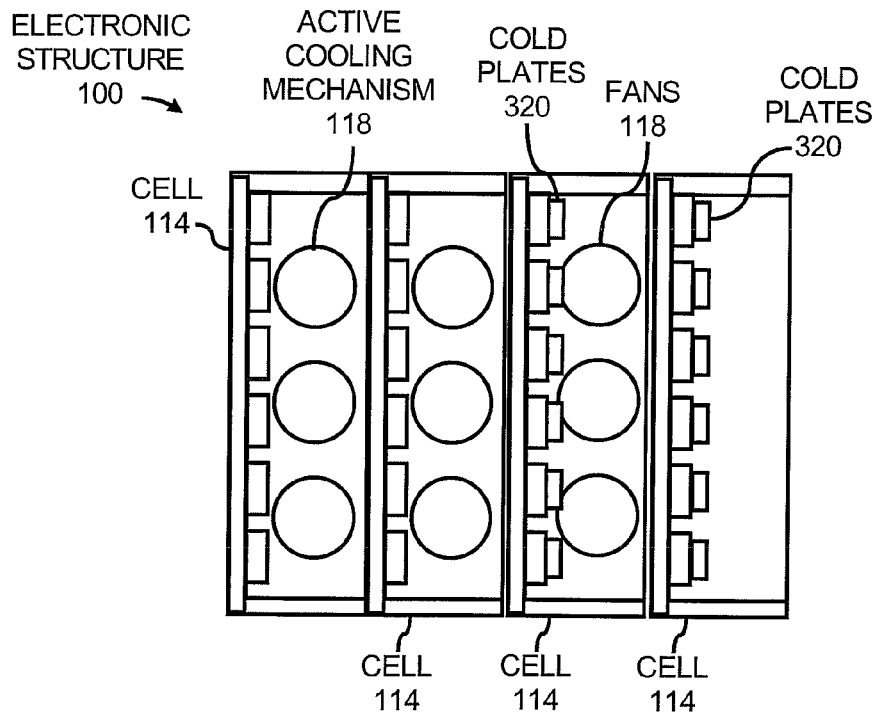
FIG. 4 depicts a simplified schematic illustration of the electronic structure depicted in FIG. 1 composed of four cells 114, according to an embodiment of the invention.

In addition, or alternatively, the electronic structure 100 may include a plurality of cells 114, where the cells 114 may include different active cooling mechanism 118 arrangements as depicted in FIG. 4. FIG. 4, more particularly, depicts a simplified schematic illustration of an electronic structure 100 composed of four cells 114, according to an example. Although four cells 114 have been depicted in FIG. 4, it should be understood that the electronic structure 100 may include any reasonably suitable number of cells, including a single cell, without departing from a scope thereof.

As shown in FIG. 4, the first two cells 114 from the left include the active cooling mechanism 118 depicted in FIG. 1. The third cell 114 includes a combination of active cooling mechanisms 118, including fans and cold plates 320. The fourth cell 114 includes the cold plates 320 without fans.

According to an example, the 3D packages 110 are arranged in one or more of the cells 114 and/or in various regions of one or more of the cells 114 based upon a characteristic of the 3D packages 110, such as, density, criticalities of workloads performed by the 3D packages 110, etc. More particularly, for instance, the 3D packages 110 are arranged in a predetermined configuration based upon a categorization of the 3D packages 110, such as, hierarchically, according to desired workload performance capabilities, etc. In this example, the 3D packages 110 may be categorized according to their respective characteristics.

By way of a particular example, those 3D packages 110 configured to perform workloads having greater levels of criticality are positioned in relatively more accessible areas as compared with 3D packages 110 that are configured to perform workloads having lesser levels of criticality. Likewise, those 3D packages 110 that are likely to perform a greater number of operations, and thus, are more likely to fail, are positioned in the relatively more accessible areas.

As another example, those 3D packages 110 that are likely to store critical information are placed in proximity to identical 3D packages 110 for redundancy purposes. In addition, the redundant 3D packages 110 are connected via interconnects having relatively short lengths.

As a further example, those 3D packages 110 that are likely to store critical information are placed in relatively closer proximity to one or more system level active cooling mechanisms 118. In addition, or alternatively, those 3D packages 110 that are likely to store critical information are placed in relatively closer proximity to a plurality of system level active cooling mechanism 118 to provide for redundancy.

As a yet further example, those 3D packages 110 that are likely to store critical information or have a relatively dense structure are equipped with package level cooling mechanisms 230a-230n. In addition, those 3D packages 110 that contain the package level cooling mechanisms 230a-230n are positioned farther away from system level cooling mechanisms 118.

According to a further example, the system level active cooling mechanisms 118 have different levels of criticalities. The different levels of criticalities may be based upon, for instance, the number of the 3D packages 110, the criticalities of the 3D packages 110, etc., that the active cooling mechanism 118 is configured to cool. Thus, for instance, those active cooling mechanisms 118 having greater levels of criticality may be positioned at relatively more accessible areas of a housing or backplane.

Figure 5:
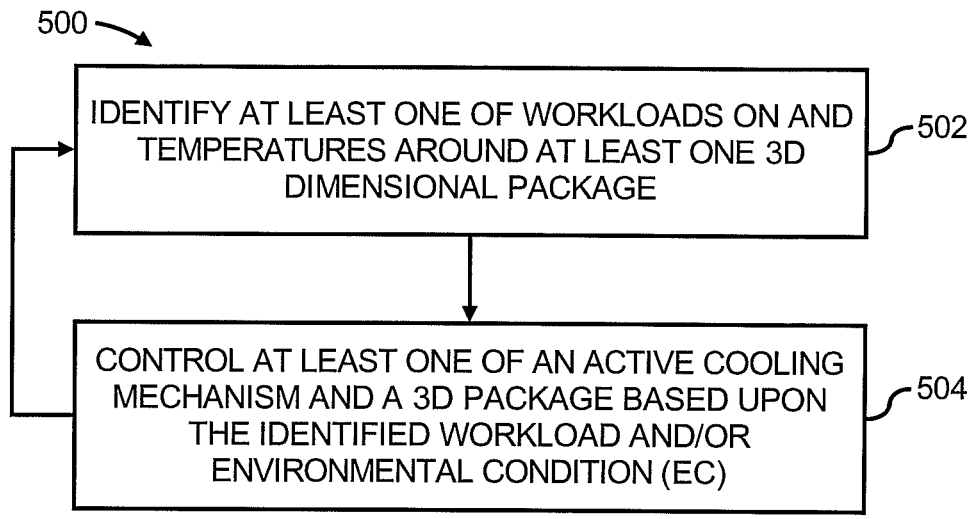
FIG. 5 shows a flow diagram of a method for managing at least one 3D package and a cooling system having at least one active cooling mechanism, according to an embodiment of the invention.

Turning now to FIG. 5, there is shown a flow diagram of a method 500 for managing at least one 3D package 110 and a cooling system 116 having at least one active cooling mechanism 118, according to an example. It should be understood that the method 500 may include additional steps and that one or more of the steps described herein may be removed and/or modified without departing from a scope of the method 500.

The description of the method 500 is made with reference to the electronic structure 100 depicted in FIGS. 1-4 and thus makes particular reference to the elements contained in the electronic structure 100. It should, however, be understood that the method 500 may be implemented in an electronic structure that differs from the electronic structure 100 without departing from a scope of the method 500.

Generally speaking, the controller 202 may implement the method 500 to manage the provisioning of cooling resources and/or the allocation of workloads in an electronic structure 100 comprising at least one 3D package and at least one active cooling mechanism. In one example, cooling resource provisioning may be efficiently managed through selective activation of one or more active cooling mechanisms 118 according to either or both of an environmental condition at or around and the workloads on the at least one 3D package 110. In another example, the cooling resource provisioning may be efficiently managed through selective placement of workloads, such as, storage of data, onto those 3D packages 110 that are operable to be cooled with minimal energy consumption by the at least one active cooling mechanism 118.

With particular reference again to FIG. 5, at step 502, the controller 130 identifies at least one of workloads on and an environmental condition (EC) at or around the at least one 3D package 110. According to an example, the controller 130 may identify the workloads from EC data received from the one or more sensors 140. In this example, the controller 130 may correlate the EC data, such as, temperature data, with particular workload levels. For instance, the correlation between temperature levels and workload levels may be stored as a lookup table in the memory 160, which the controller 130 may access in identifying the workloads. According to another example, the controller 130 may simply store the environmental condition data received from the one or more sensors 140.

According to a further example, the controller 130 may identify the workloads from data received from the workload monitor 150. In this example, the workload monitor 150 may track or predict the workloads that have been or are scheduled to be assigned to the at least one 3D package 110 and may communicate this information to the controller 130.

At step 504, the controller 130 controls at least one of an active cooling mechanism 118 and a 3D package 110 based upon at least one of the identified workload and EC.

Steps 502 and 504 may be repeated to continuously identify the workloads on and/or ECs at or around the at least one 3D package 110 and to continuously update control of the at least one active cooling mechanism 118 and the at least one 3D package 110 based upon the identified workloads and/or ECs.

According to an example, at step 504, a plurality of the 3D packages may be controlled to perform the same workload through allocation of the same workload to the plurality of 3D packages 110 to, for instance, provide redundancy in the performance of the workload. For instance, where the workload comprises storage of data, the data may be stored on multiple 3D packages to provide redundant storage of the data.

According to a further example in which one or more of the 3D packages 110 include package-level active cooling mechanisms 230a-230n, the controller 130 may further identify at least one of workload on and environmental condition at or around a plurality of die forming the one or more of the 3D packages 110 at step 502. In addition, at step 504, the controller 130 may further control the package-level active cooling mechanisms 230a-230n based upon one or both of the identified workload and environmental condition.

Figure 6:
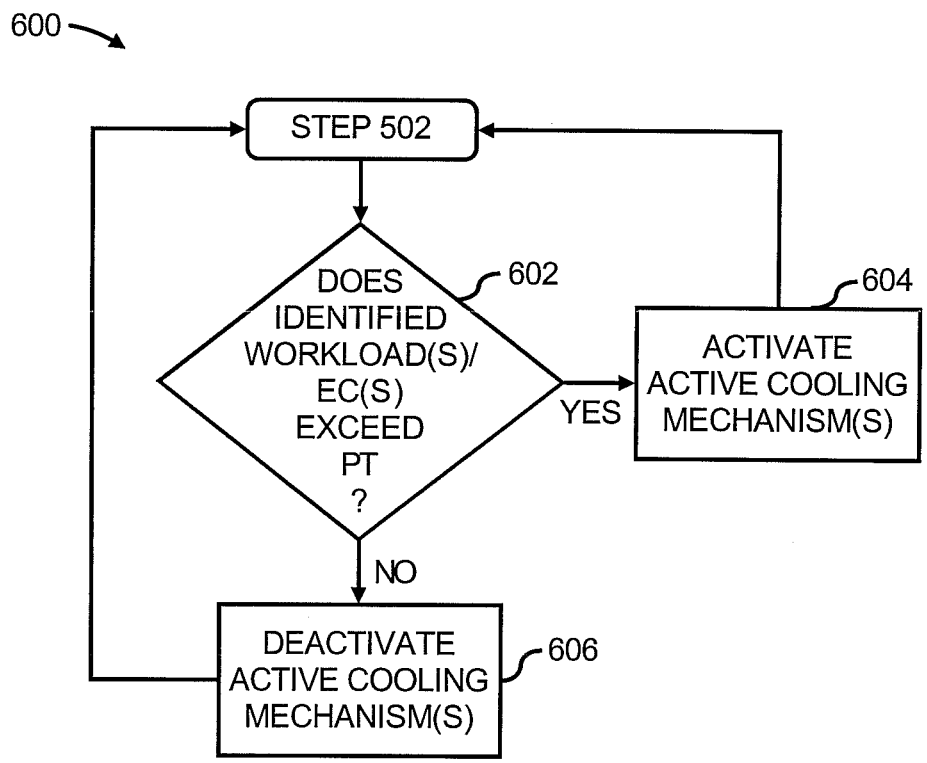
FIG. 6 shows a flow diagram of a method for managing at least one 3D package and a cooling system having at least one active cooling mechanism in furtherance of the method depicted in FIG. 5, according to an embodiment of the invention.

With reference now to FIG. 6, there is shown a flow diagram of a method 600 for managing a plurality of 3D packages 110 and a cooling system 116 having at least one active cooling mechanism 118 in furtherance to the method 500 depicted in FIG. 5, according to an example. In the method 600, steps 604 and 606 are more detailed illustrations of an example of step 504 in FIG. 5.

At step 602, the controller 130 compares the identified workloads with a predetermined workload threshold (PWT) range and the identified environmental condition (EC) with a predetermined threshold (PT) range for each of the 3D packages 110. The PWT range and the PT range may be the same for each of the 3D packages 110, for instance, when the 3D packages 110 are configured to operate at around the same ECs. Alternatively, either or both of the PWT range and the PT range may differ for one or more of the 3D packages 110, for instance, when one or more of the 3D packages 110 are configured to perform different types of workloads.

At step 602, if the identified workload on a 3D package 110 exceeds the PWT range and/or the identified EC at or around a 3D package 110 exceeds the PT range, the controller 130 activates one or more active cooling mechanisms 118 to increase cooling provisioning supplied to the at least one 3D package 110, as indicated at step 604. If, however, the identified workload on a 3D package 110 falls below the PWT range and/or the identified EC at or around the at least one 3D package 110 falls below the PT range, and if at least one of the active cooling mechanisms 118 is currently active, at step 606, the controller 130 deactivates one or more of the active cooling mechanisms 118 to decrease cooling provisioning supplied to the at least one 3D package 110.

In the example depicted in FIG. 6, the controller 130 controls the at least one active cooling mechanism 118 on an "as needed" basis, thereby substantially minimizing the amount of energy associated with operating the at least one active cooling mechanism 118. In addition, the controller 130 may separately control a plurality of active cooling mechanisms 118 to provide substantially focalized cooling provisioning, which may also substantially minimize energy consumption. In other words, the controller 130 may activate one or more of the active cooling mechanisms 118 while simultaneously deactivating other active cooling mechanisms 118, depending upon, for instance, the locations of the 3D packages 110 and whether not the die 102-106 require additional cooling or may operate with lesser amounts of cooling.

In any regard, following either or both of steps 604 and 606, step 602 may be repeated to again identify workloads on and/or ECs at or around the at least one 3D package 110, and may repeat steps 602-606 to substantially continuously monitor the workloads and/or ECs and to substantially continuously control the active cooling mechanisms 118 based upon changing conditions in and around the at least one 3D package 110.

According to the example described above with respect to one or more 3D packages 110 having package-level active cooling mechanisms 230a-230n, the controller 130 may elect to activate or deactivate either or both of the system-level active cooling mechanisms 118 and the package-level active cooling mechanisms 230a-230n at steps 604 and 606. By way of example, the controller 130 may cause the package-level active cooling mechanisms 230a-230n of a particular 3D package 110 to become activated at step 604 if such activation is likely to result in sufficient cooling.

According to an example, the cooling system 116 includes a plurality of active cooling mechanisms 118, 230a-230n and the controller 130 is configured to compare the workloads with a plurality PWT ranges and/or ECs with a plurality of PT ranges. In this example, during a first iteration of the method 600, the workload and/or EC identified at step 502 is compared with at least one of a first PWT range and a first PT range at step 602 and at least one of the active cooling mechanisms 118, 230a-230n is controlled in response to the identified workload exceed the first PWT range and/or EC exceeding the first PT range at steps 604 and 606. In addition, for instance, when the identified workload exceeds the first PWT range and/or EC exceeds the first PT range, during a second iteration of the method 600, the identified workload is compared with a second PWT range and/or EC is compared with a second PT range, which comprise higher thresholds as compared with the first PWT range and the first PT range. Based on the comparison, one or more second active cooling mechanisms 118, 230a-230n are controlled at steps 604 and 606. By way of example, at step 604, a second active cooling mechanism 118 may be activated in response to the identified workload exceeding the second PWT range to supplying greater cooling provisioning to one or more of the 3D packages 110.

Figure 7:
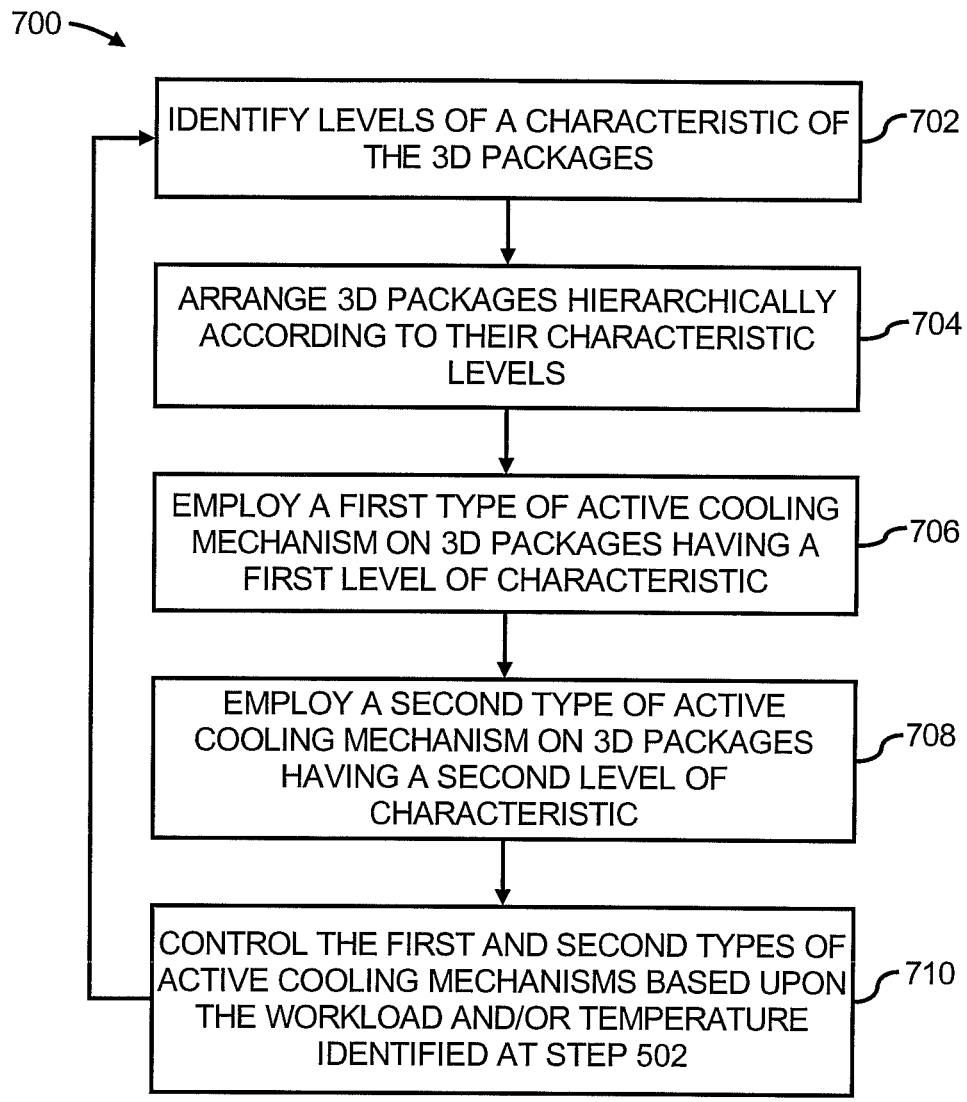
FIG. 7 shows a flow diagram of a method of controlling different types of active cooling mechanisms in furtherance of the method depicted in FIG. 5, according to an embodiment of the invention.

With reference now to FIG. 7, there is shown a flow diagram of a method of controlling different types of active cooling mechanisms 118 in furtherance of the method 500 depicted in FIG. 5, according to an example. It should be understood that the method 700 may include additional steps and that one or more of the steps described herein may be removed and/or modified without departing from a scope of the method 700.

At step 702, levels of a characteristic of a plurality of 3D packages 110 are identified. The characteristic may comprise, for instance, densities of the 3D packages 110, criticalities of the workloads performed by the 3D packages 110, etc. At step 704, the 3D packages 110 are arranged hierarchically according to their characteristic levels. The 3D packages 110 may be arranged hierarchically in either or both of a physical and an illustrative sense. In other words, at step 704, for instance, some or all of the 3D packages 110 having the same level of characteristic may be positioned in the same cell 114 or in the same region of a cell 114. In addition, or alternatively, the characteristic levels of the 3D packages 110 may be arranged in an illustrative sense, that is, not physically moved, to identify how the levels compare with respect to each other.

In any event, at step 706, a first type of active cooling mechanism 118, 230a-230n is employed on the 3D packages 110 identified as having a first level of the characteristic. In addition, a second type of active cooling mechanism 118, 230a-230n is employed on the 3D packages 110 identified as having a second level of the characteristic at step 708. Although not shown, additional types of active cooling mechanisms 118, 230a-230n may be employed on 3D packages 110 having other levels of the characteristic. In any regard, at step 710, which is similar to step 504 in the method 500, the controller 130 controls one or both of the first and second types of active cooling mechanisms based upon the workloads and/or ECs identified at step 502.

By way of example, the characteristic levels may comprise density levels of the 3D packages 110, the first type of active cooling mechanism 118 may comprise a variable flow liquid cold plate attached to the 3D packages 110 having the first level of the density, and the second type of active cooling mechanism 118 may comprise a variable flow fan. In this example, the controller 130 may control the variable flow liquid cold plate to cool the 3D packages 110 having a relatively higher density level in the hierarchy and may control the variable flow fan to cool the 3D packages 110 having a relatively lower density level in the hierarchy.

In another example, the characteristic levels may comprise criticality levels of workloads performed by the 3D packages 110. In this example, the controller 130 may control the variable flow liquid cold plate cool the 3D packages 110 having a relatively higher workload criticality level in the hierarchy and may control the variable flow fan to cool the 3D packages 110 having a relatively lower workload criticality level in the hierarchy.

According to a further example, the characteristic levels may comprise cooling capacities of the first type of active cooling mechanism and the second type of active cooling mechanism. In this example, the controller 130 may allocate workload onto the plurality of 3D packages 110 according to a hierarchical scheme at step 504. Moreover, at step 502, the controller 130 may identify the workloads on the 3D packages 110, and the controller 130 may receive at least one additional workload to be allocated to one or more of the 3D packages 110. At step 504, the controller 130 may allocate the at least one additional workload onto one or more of 3D packages 110 based upon the current workloads on the 3D packages 110.

Figure 8:
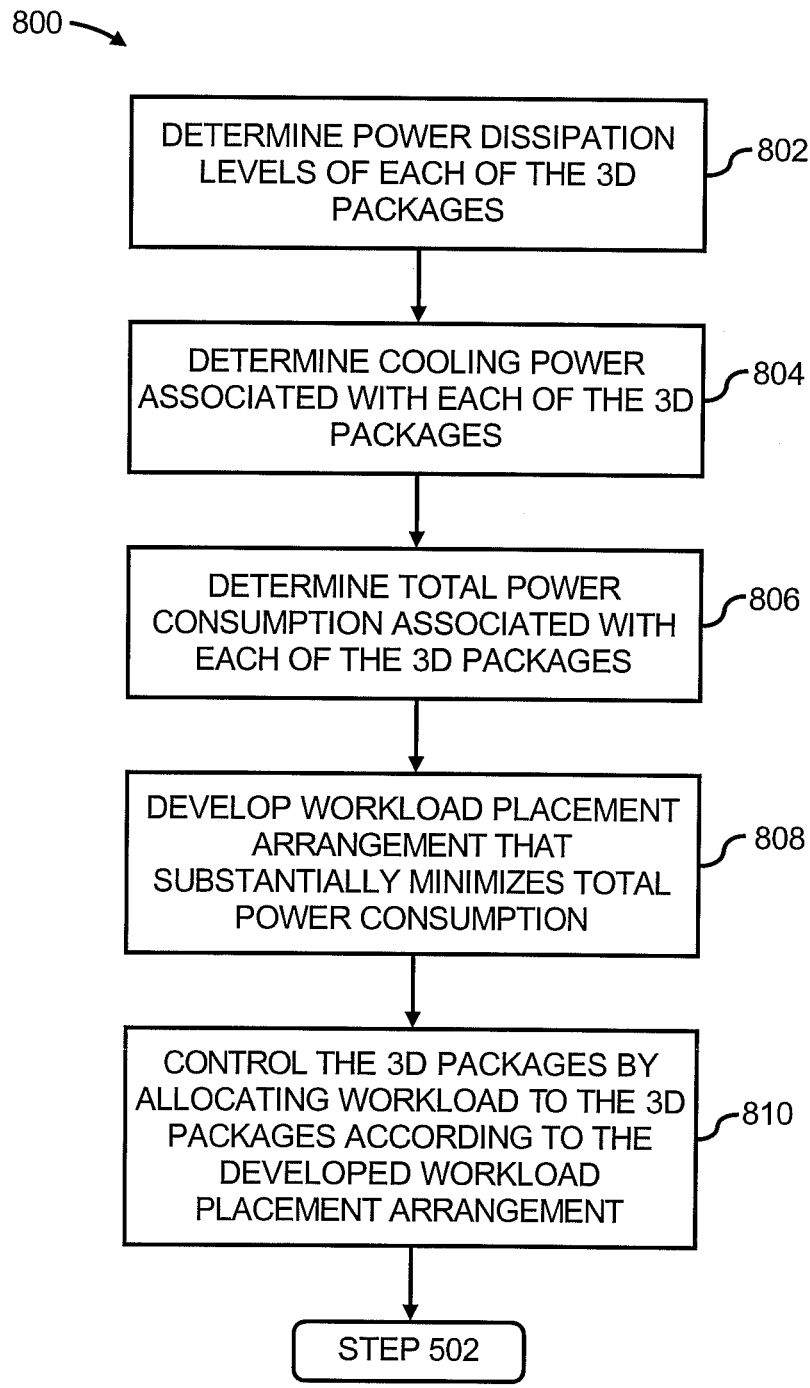
FIG. 8 shows a flow diagram of a method for managing a plurality of 3D packages and a cooling system having at least one active cooling mechanism in furtherance of the method depicted in FIG. 5, according to an embodiment of the invention.

Turning now to FIG. 8, there is shown a flow diagram of a method 800 for managing a plurality of 3D packages 110 and a cooling system 116 in furtherance of the method 500 depicted in FIG. 5, according to an example. It should be understood that the method 800 may include additional steps and that one or more of the steps described herein may be removed and/or modified without departing from a scope of the method 800.

As shown, the power dissipation levels of each of the 3D packages 110 in are determined at step 802. The power dissipation levels may be determined or identified from the rated power dissipation levels of each of the 3D packages 110 as provided by the 3D package 110 manufacturers. In addition, or alternatively, the power dissipation levels may be determined through testing of the 3D packages 110.

At step 804, the cooling power associated with each of the 3D packages 110 is determined. The cooling power of each of the 3D packages 110 may be defined as the amount of power the active cooling mechanisms 118, 230a-230n consume in respectively cooling the 3D packages 110. Thus, for instance, the cooling power may be a function of the amount of heat generated by the 3D packages 110, the effectiveness of passive cooling mechanisms on the 3D packages 110, the efficiency and effectiveness of each of the active cooling mechanisms 118, 230a-230n on the 3D packages 110, etc.

In addition, at step 806, the total power consumption levels of the 3D packages 110, which is a combination of the power dissipation levels and the cooling power levels of the 3D packages 110, may be determined from the power dissipation levels and the cooling power levels of each of the 3D packages 110.

At step 808, the controller 130 develops a workload placement arrangement that substantially minimizes the total power consumption levels of the 3D packages 110. More particularly, for instance, the controller 130 may arrange the total power consumption levels the 3D packages 110 in a hierarchical manner to determine which of the 3D packages 110 are able to perform the workloads while consuming the least amount of total power, both in terms of power dissipation levels and the cooling power. In addition, at step 810, the controller 130 further controls the 3D packages 110 (step 504 in FIG. 5) by allocating workload to the 3D packages 110 according to the workload placement arrangement developed at step 808.

Steps 802-808 may be performed prior to step 502 in FIG. 5 and step 810 may be performed in place of step 504 in FIG. 5.

Following step 810, steps 502 and 504 may be performed to update the control of the at least one active cooling mechanism and the stacked die based upon the workloads allocated at step 810.

Figure 9:
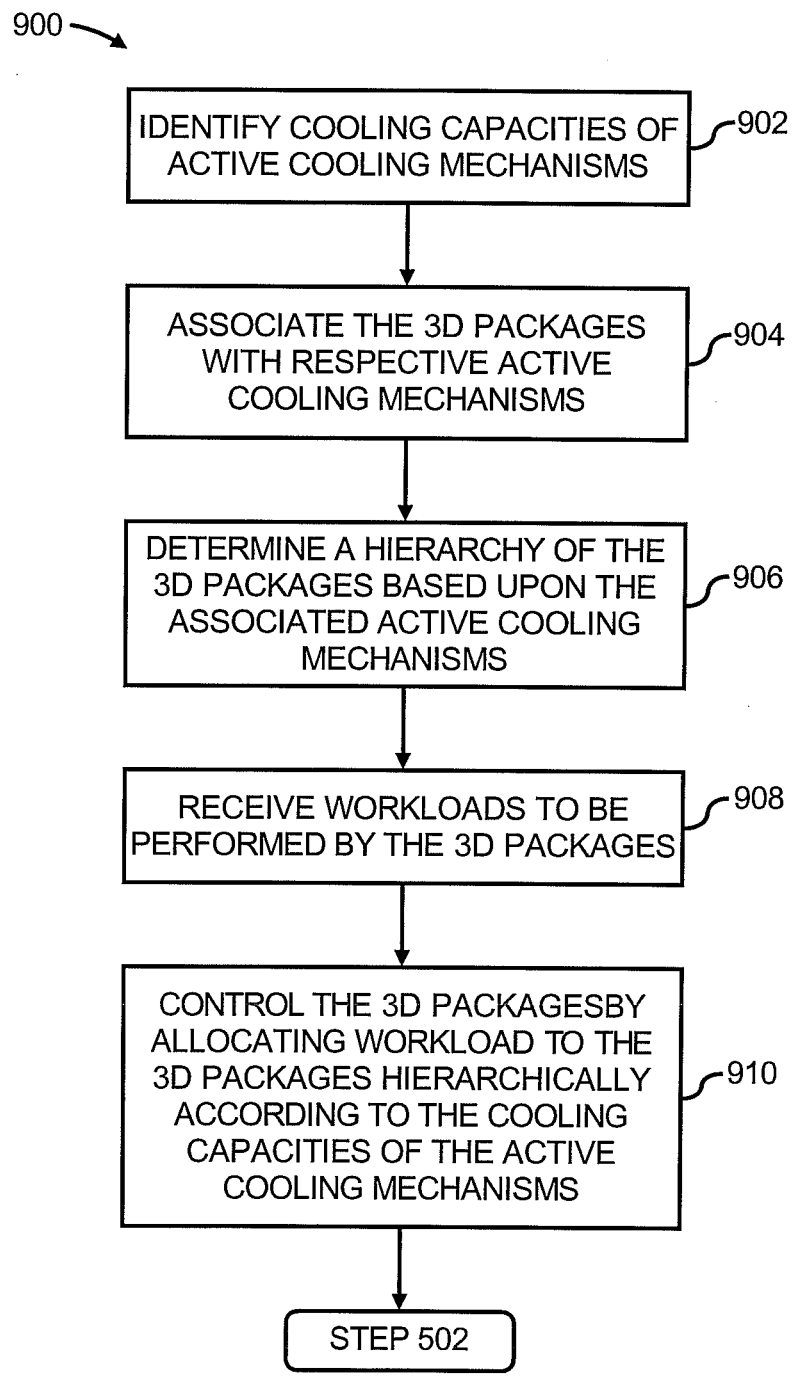
FIG. 9 shows a flow diagram of a method for managing a plurality of 3D packages and a cooling system having at least one active cooling mechanism in furtherance of the method depicted in FIG. 5, according to an embodiment of the invention.

Turning now to FIG. 9, there is shown a flow diagram of a method 900 for managing a plurality of 3D packages 110 and a cooling system 116 in furtherance of the method 500 depicted in FIG. 5, according to an example. It should be understood that the method 900 may include additional steps and that one or more of the steps described herein may be removed and/or modified without departing from a scope of the method 900.

At step 902, the cooling capacities of the active cooling mechanisms 118, 230a-230n are identified. The cooling capacities may be defined as the operational and/or maximum levels of cooling the active cooling mechanisms 118, 230a-230n are able to provide to the 3D packages 110. Thus, for instance, one or more of the active cooling mechanisms 118, 230a-230n may be configured to provide greater levels of cooling provisioning as compared with other ones of the active cooling mechanisms 118, 230a-230n.

At step 904, each of the 3D packages 110 is associated with one or more of the active cooling mechanisms 118, 230a-230n. The "associations" between the 3D packages 110 and the active cooling mechanisms 118, 230a-230n may be defined by the level of influence the active cooling mechanisms 118, 230a-230n have over each of the 3D packages 110. By way of example, a 3D package 110 may be associated with one or more active cooling mechanisms 118, 230a-230n that have at least a predetermined minimum level of influence in the cooling provisioning provided to the 3D package 110. According to an example, the associations may be determined by varying operations of the active cooling mechanisms 118, 230a-230n and monitoring whether those variations have at least a predetermined level of influence on the 3D packages 110.

At step 906, the controller 130 determines a hierarchical relationship among the 3D packages 110 based upon which of the active cooling mechanisms 118, 230a-230n are associated with which of the 3D packages 110. By way of example, the controller 130 may place those 3D packages 110 that are associated with the active cooling mechanisms 118, 230a-230n having the highest cooling capacities at the highest level and those 3D packages 110 that are associated with the active cooling mechanisms 118, 230a-230n having the lowest cooling capacities at the lowest level of the hierarchy.

At step 908, the controller 130 receives workloads that are to be performed by the 3D packages 110. In addition, at step 910, the controller 130 controls the 3D packages (step 504 in FIG. 5) by allocating workload to the 3D packages 110 hierarchically according to the cooling capacities of the active cooling mechanisms 118, 230a-230n. By way of example, at step 910, the controller 130 allocates workloads to the 3D packages 110 at the highest level of the hierarchy and then allocates the remaining workloads to the remaining 3D packages 110 according to their levels in the hierarchy.

Steps 902-908 may be performed prior to step 502 in FIG. 5 and step 910 may be performed in place of step 504 in FIG. 5. In addition, following step 910, steps 502 and 504 (step 910) may be performed to update the control of the at least one active cooling mechanism 118, 230a-230n and the 3D packages 110 based upon the hierarchy of 3D packages 110 determined at step 906.

Figure 10:
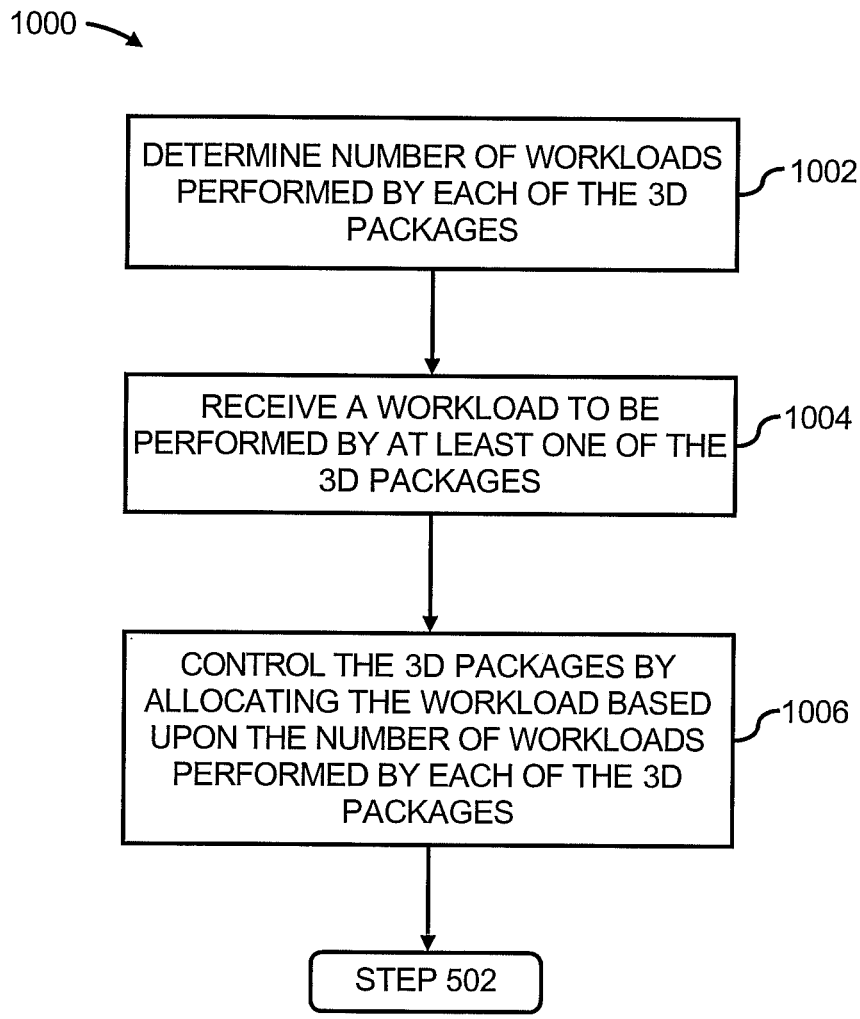
FIG. 10 shows a flow diagram of a method for managing a plurality of 3D packages and a cooling system having at least one active cooling mechanism in furtherance of the method depicted in FIG. 5, according to an embodiment of the invention.

Turning now to FIG. 10, there is shown a flow diagram of a method 1000 for managing a plurality of 3D packages 110 and a cooling system 116 in furtherance of the method 500 depicted in FIG. 5, according to an example. It should be understood that the method 1000 may include additional steps and that one or more of the steps described herein may be removed and/or modified without departing from a scope of the method 1000.

At step 1002, the controller 130 determines the number of workloads that each of the 3D packages 110 has historically performed. Thus, for instance, the controller 130 may track how many operations each of the 3D packages 110 have performed throughout their lifetimes.

At step 1004, the controller 130 receives a workload to be performed by at least one of the 3D packages 110. In addition, at step 1006, the controller 130 controls the 3D packages 110 (step 504 in FIG. 5) by allocating workload to the 3D packages 110 based upon the number of workloads determined to have been performed by each of the 3D packages 110. By way of example, at step 1006, the controller 130 first allocates workloads to the 3D packages 110 that have performed the least number of workloads, for instance, to prolong the useful lives of each of the 3D packages 110.

Steps 1002 and 1004 may be performed prior to step 502 in FIG. 5 and step 1006 may be performed in place of step 504 in FIG. 5. In addition, following step 1006, steps 502 and 504 (step 1006) may be performed to update the control of the at least one active cooling mechanism 118, 230a-230n and the 3D packages 110 based upon the hierarchy of 3D packages 110 determined at step 906.

Figure 11:
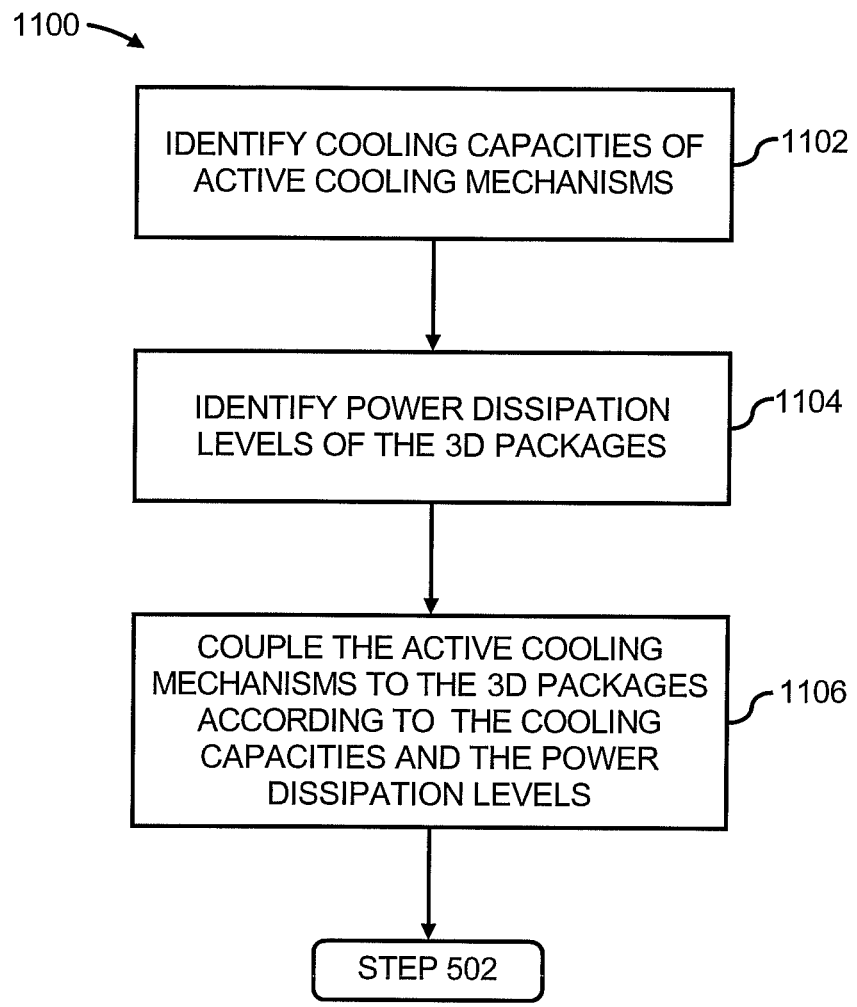
FIG. 11 shows a flow diagram of a method for managing a plurality of 3D packages and a cooling system having at least one active cooling mechanism in furtherance of the method depicted in FIG. 5, according to an embodiment of the invention.

With reference now to FIG. 11, there is shown a flow diagram of a method 1100 for managing a plurality of 3D packages 110 and a cooling system 116 in furtherance of the method 500 depicted in FIG. 5, according to an example. It should be understood that the method 1100 may include additional steps and that one or more of the steps described herein may be removed and/or modified without departing from a scope of the method 1100.

At step 1102, the cooling capacities of a plurality of active cooling mechanisms 118, 230-230n are identified. The cooling capacities may be identified in any reasonably suitable manner, such as, the manners discussed above with respect to step 902 (FIG. 9). At step 1104, the power dissipation levels of the 3D packages 110 are identified. Again, the power dissipation levels may be identified in any reasonably suitable manner, such as, the manners discussed above with respect to step 802 (FIG. 8).

At step 1106, the active cooling mechanisms 118, 230a-230n are coupled to the 3D packages 110 according to the cooling capacities of the active cooling mechanisms 118, 230a-230n identified at step 1102 and the power dissipation levels of the 3D packages 110 identified at step 1104. By way of example, the active cooling mechanisms 118, 230a-230n having the highest cooling capacities may be physically coupled to the 3D packages 110 having the highest power dissipation levels.

Steps 1102-1106 may be performed prior to step 502 in FIG. 5 during, for instance, an initial construction stage or during a reconstruction operation of the electronic structure 100. In addition, following step 1106, steps 502 and 504 may be performed as discussed above with respect to FIG. 5.

Some of the operations set forth in the methods 500-1100 may be contained as one or more utilities, programs, or subprograms, in any desired computer accessible or readable medium. In addition, the methods 500-1100 may be embodied by a computer program, which may exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 12:
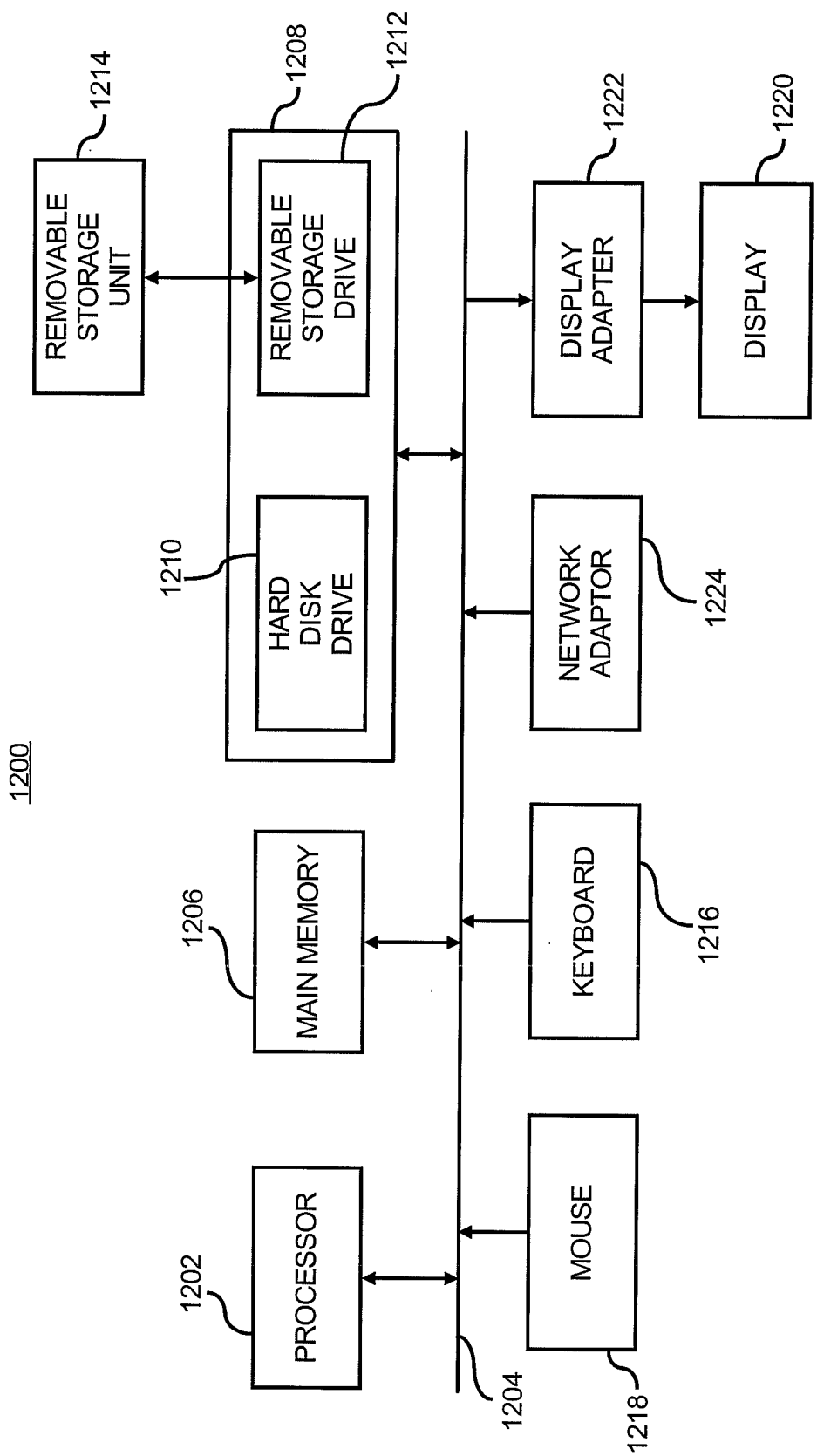
FIG. 12 illustrates a computer system, which may be employed to perform various functions of the controller depicted in FIG. 1 in performing some or all of the steps contained in the diagrams depicted in FIGS. 5-11, according to an embodiment of the invention.

FIG. 12 illustrates a computer system 1200, which may be employed to perform the various functions of the controller 130 described herein above with, according to an example. In this respect, the computer system 1200 may be used as a platform for executing one or more of the functions described hereinabove with respect to the controller 130.

The computer system 1200 includes a processor 1202, which may be used to execute some or all of the steps described in the methods 500-1100. Commands and data from the processor 1202 are communicated over a communication bus 1204. The computer system 900 also includes a main memory 1206, such as a random access memory (RAM), where the program code may be executed during runtime, and a secondary memory 1208. The secondary memory 1208 includes, for example, one or more hard disk drives 1210 and/or a removable storage drive 1212, representing a floppy diskette drive, a magnetic tape drive, a compact disk drive, etc., where a copy of the program code for managing at least one three-dimensional package and a cooling system may be stored.

The removable storage drive 1210 reads from and/or writes to a removable storage unit 1214 in a well-known manner. User input and output devices may include a keyboard 1216, a mouse 1218, and a display 1220. A display adaptor 1222 may interface with the communication bus 1204 and the display 1220 and may receive display data from the processor 902 and convert the display data into display commands for the display 1220. In addition, the processor 1202 may communicate over a network, for instance, the Internet, LAN, etc., through a network adaptor 1224.

It will be apparent to one of ordinary skill in the art that other known electronic components may be added or substituted in the computer system 1200. In addition, the computer system 1200 may include a system board or blade used in a rack in a data center, a conventional "white box" server or computing device, etc. Also, one or more of the components in FIG. 12 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method for managing a plurality of three-dimensional packages and a cooling system having a plurality of active cooling mechanisms, said method comprising:
    associating each of the plurality of three-dimensional packages with a respective active cooling mechanism, wherein at least two of the plurality of active cooling mechanisms have different cooling capacities;
    receiving a plurality of workloads to be performed by the plurality of three-dimensional packages, wherein each of the plurality of three-dimensional packages contains a plurality of stacked die;
    allocating, by a processor, the plurality of workloads on the plurality of three-dimensional packages hierarchically according to the cooling capacities of the plurality of active cooling mechanisms respectively associated with the plurality of three-dimensional packages.

2. The method according to claim 1, wherein the plurality of active cooling mechanisms comprises a first type of active cooling mechanism and a second type of active cooling mechanism, said method further comprising:
    identifying levels of a characteristic of the plurality of three-dimensional packages, wherein the plurality of three-dimensional packages are physically arranged hierarchically according to their respective levels of the characteristic;
    employing the first type of active cooling mechanism on the three-dimensional packages having a first level of the characteristic; and
    employing the second type of active cooling mechanism on the three-dimensional packages having a second level of the characteristic.

3. The method according to claim 1, further comprising:
    determining a number of workloads historically performed by each of the plurality of three-dimensional packages;
    receiving a workload to be performed by at least one of the plurality of three-dimensional packages; and wherein allocating the plurality of workloads further comprises allocating the received workload to at least one of the plurality of three-dimensional packages based upon the number of workloads performed by each of the plurality of three-dimensional packages.

4. The method according to claim 1, wherein at least two of the plurality of three-dimensional packages have different power dissipation levels with respect to each other, and wherein associating each of the plurality of three-dimensional packages with a respective active cooling mechanism further comprises associating the active cooling mechanism having a highest cooling capacity to the three-dimensional package of the plurality of three-dimensional packages having a highest power dissipation level.

5. A method for managing a plurality of three-dimensional packages and a cooling system having a first active cooling mechanism positioned to cool a first three-dimensional package and a second active cooling mechanism positioned to cool a second three-dimensional package, wherein the first active cooling mechanism has a different cooling capacity as compared with the second active cooling mechanism, said method comprising:
  allocating, by a processor, a plurality of workloads onto the plurality of three-dimensional packages according to a hierarchical scheme, said hierarchical scheme being based upon the cooling capacities of the first active cooling mechanism and the second active cooling mechanism.

6. The method according to claim 5, further comprising:
  identifying current workloads on the plurality of three-dimensional packages;
  receiving at least one additional workload; and
  wherein allocating the plurality of workloads further comprises allocating the at least one additional workload onto the plurality of three-dimensional packages based upon the current workloads on the plurality of three-dimensional packages.

7. The method according to claim 5, further comprising:
  determining power dissipation levels of the plurality of three-dimensional packages;
  determining cooling power associated with the plurality of three-dimensional packages;
  determining total power consumption associated with the plurality of three-dimensional packages based upon the power dissipation levels and the cooling power of the plurality of three-dimensional packages;
  developing a workload placement arrangement that substantially minimizes the total power consumption in performing workloads on the plurality of three-dimensional packages; and
  wherein allocating the plurality of workloads further comprises allocating the plurality of workloads to the plurality of three-dimensional packages according to the developed workload placement arrangement.

8. An electronic structure comprising:
  a plurality of three-dimensional packages, wherein each of the plurality of three-dimensional packages is formed of a plurality of stacked die;
  a cooling system having a first active cooling mechanism positioned to cool a first three-dimensional package and a second active cooling mechanism to cool a second three-dimensional package, wherein the first active cooling mechanism has a different cooling capacity as compared with the second active cooling mechanism;
  a controller to allocate a plurality of workloads onto the plurality of three-dimensional packages according to a hierarchical scheme, said hierarchical scheme being based upon the cooling capacities of the first active cooling mechanism and the second cooling mechanism.

9. The electronic structure according to claim 8, further comprising:
  a workload monitor to at least one of predict and track workloads on the plurality of three-dimensional packages, and wherein the controller is further to receive the at least one of the predicted and tracked workloads from the workload monitor.

10. The electronic structure according to claim 8, wherein the first active cooling mechanism comprises a package-level active cooling mechanism, and wherein the controller is further to control the package-level active cooling mechanism.

11. The electronic structure according to claim 8, wherein the electronic structure comprises a housing containing a backplane, wherein the plurality of three-dimensional packages are categorized according to a characteristic of the workloads to be respectively performed by the plurality of three-dimensional packages, and wherein the plurality of three-dimensional packages are physically arranged on the backplane according to a predetermined hierarchy of the categorized three-dimensional packages.

12. The electronic structure according to claim 11, wherein the housing and the backplane comprise relatively less accessible and relatively more accessible areas, wherein the characteristic of the workloads comprises criticalities of the workloads, and wherein those three-dimensional packages having greater criticalities are physically positioned in the relatively more accessible areas and those three-dimensional packages having lesser criticalities are physically positioned in the relatively less accessible areas of the backplane and housing.

13. The electronic structure according to claim 8, wherein the electronic structure comprises a housing having relatively less accessible and relatively more accessible areas, wherein the cooling system includes a plurality of active cooling mechanisms having different criticalities, and wherein those active cooling mechanisms having relatively greater criticalities are physically positioned in the relatively more accessible areas and those active cooling mechanisms having relatively lesser criticalities are physically positioned in the relatively less accessible areas of the housing.

14. The electronic structure according to claim 8, further comprising:
  a plurality of cells, each of said plurality of cells housing a respective backplane and a plurality of three-dimensional packages formed of a plurality of stacked die physically connected to a respective backplane, each of said plurality of cells comprising a respective cooling system having an active cooling mechanism; and
  for each of the plurality of cells individually, said controller is to allocate workloads onto the plurality of three-dimensional packages.

15. The electronic structure according to claim 14, wherein the cooling system of at least one of the plurality of cells includes the first active cooling mechanism and the cooling system of at least another one of the plurality of cells includes the second active cooling mechanism, wherein the first active cooling mechanism is to remove greater amounts of heat as compared with the second active cooling mechanism.

16. The electronic structure according to claim 15, wherein the at least one of the plurality of cells that includes the first active cooling mechanism comprises a relatively higher density of three-dimensional packages as compared with the at least another one of the plurality of cells that includes the second active cooling mechanism.

17. A non-transitory computer readable storage medium on which is stored machine readable instructions that when executed by a processor cause the processor to implement a method for managing a three-dimensional package and a cooling system having a first active cooling mechanism to cool a first three-dimensional package and a second active cooling mechanism to cool a second three-dimensional package, said machine readable instructions comprising code to:

allocate a plurality of workloads onto the plurality of three-dimensional packages according to a hierarchical scheme, said hierarchical scheme being based upon cooling capacities of the first active cooling mechanism and the second active cooling mechanism, wherein the first active only mechanism as a different cooling capacity as compared with the second active cooling mechanism.

* * * * *

UNITED STATES PATENT AND TRADEMARK OFFICE
CERTIFICATE OF CORRECTION

PATENT NO.       : 8,560,141 B2  
APPLICATION NO.  : 12/936000  
DATED            : October 15, 2013  
INVENTOR(S)      : Amip Shah et al.

Page 1 of 1

It is certified that error appears in the above-identified patent and that said Letters Patent is hereby corrected as shown below:

In the Claims:

In column 16, line 42, in Claim 1, after "stacked die;" insert -- and --.

Signed and Sealed this  
Third Day of June, 2014

Michelle K. Lee  
*Deputy Director of the United States Patent and Trademark Office*